May 24, 1927.
N. B. HENRY
GIN
Filed March 3, 1926
1,630,005
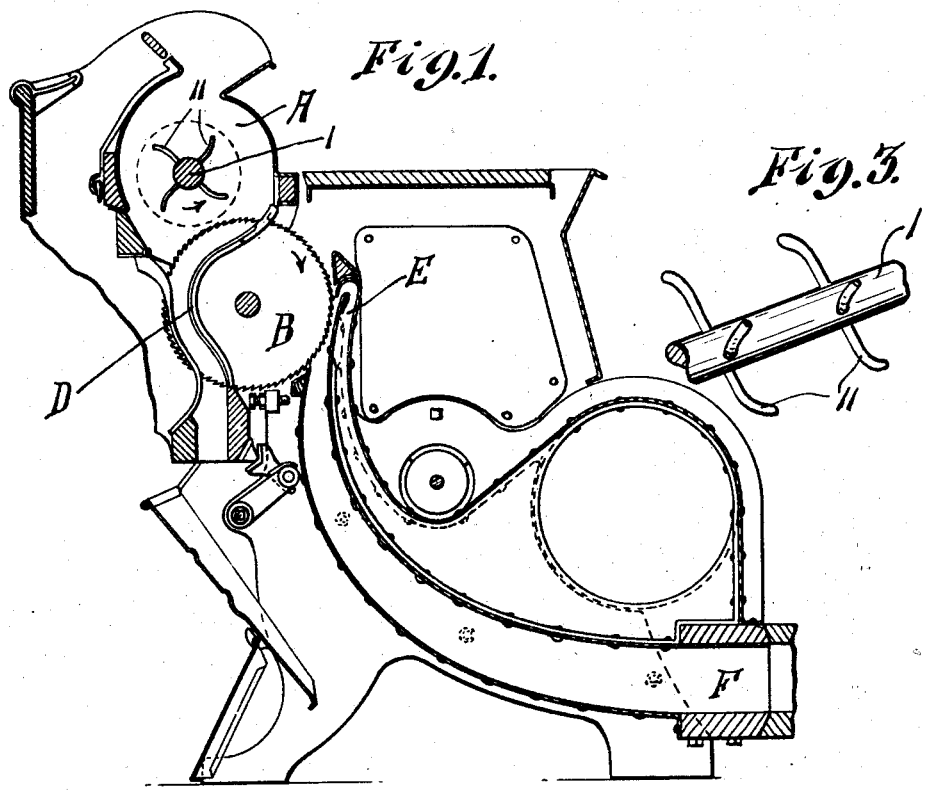
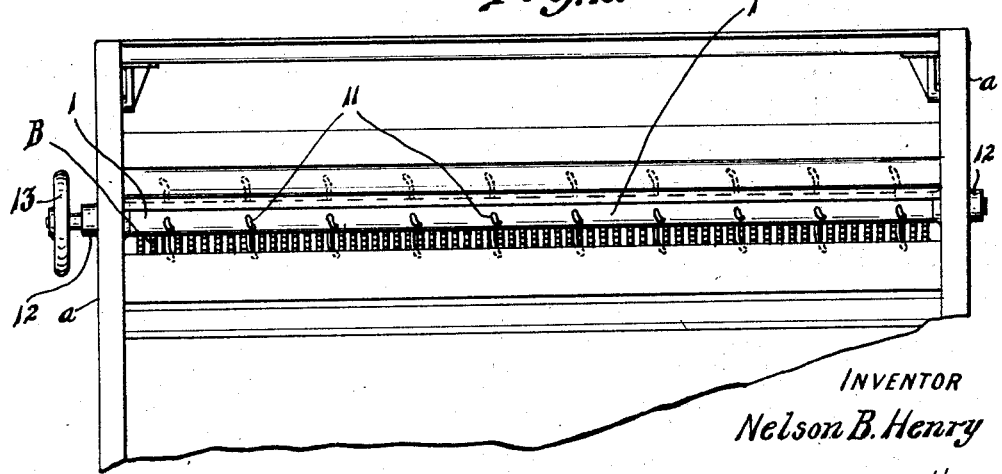
INVENTOR
Nelson B. Henry
By Mitchell, Chadwick & Kent,
ATTORNEYS Patented May 24, 1927.

1,630,005

UNITED STATES PATENT OFFICE.

NELSON B. HENRY, OF ATLANTA, GEORGIA.

GIN.

Application filed March 3, 1926. Serial No. 92,035.

My invention has relation to that class of machines known as saw cotton gins, and in such connection it relates to a new system of roll formation whereby the lint is removed from the seeds by the saws more thoroughly, with less damage to the staple and more quickly than has heretofore been known.

In the drawings:

Figure 1 is a cross-sectional elevation of a common type of gin, showing my improvements in place;

Figure 2 is a partial plan view of Figure 1;

Figure 3 is a perspective view of a portion of the integrator shaft.

In cotton gins as usually constructed and operated there is a shaft carrying a multiplicity of spaced saws, a part of the periphery of which saws projects severally between ginning ribs, into the roll box of the gin, within which is the "roll" made up of seed cotton, worked into a cylindrical roll by the turning motion imparted to it by the saw teeth coming through the ribs, with which the seed cotton is in contact and engaged.

A "roll" is formed by placing seed cotton within the roll box, which cotton, being in contact with the moving saws is turned into cylindrical form, at the same time that the saw teeth seize fibres of lint, with their adhering seeds and drag them to the ginning ribs, through which the lint fibres are carried by the engaging teeth and the seeds being too large to pass between the ribs, are rejected and fall downward and out of the gin. It has been found by ginners that the best results are attained with (say) saw cylinders revolving at 400 to 450 R. P. M. and that with this saw cylinder, a roll of a certain density produces the best results, in the quality and quantity of the ginned staple and the delinting of each seed. The density of the roll is attained after the roll is initially formed, by the relative speed of the feed of seed cotton, the regulation of which is a matter of skill and judgment of the ginner in charge of the gins.

Such a roll as I have described is and must be dense enough to preserve its integrity, i. e. its coherence as a roll, in order that the ginning may be carried on continuously and in order that the roll may continuously rotate as a whole. This necessary density is such that a considerable proportion of the fibres of which the roll is made up are tightly entangled in the body of the roll and, when seized by a saw, many of these fibres are broken, thus to the extent that this occurs, damaging the staple and producing an inferior sample.

I have discovered that it is possible to avoid this fibre breakage, to make the delinting of the seeds much more perfect and to greatly increase the productive capacity of the gin. In the drawings I have shown an ordinary type of gin, fitted with my improvements, in which A is the roll box; a, the end walls of the roll box, B the saw cylinder, D the ginning ribs, E the lint removing element and F the lint exit. I have shown the lint removing element as an air blast since this is a practical necessity in a high speed gin.

All the matters that I have mentioned are old and well known and are shown merely in order to make clear the novel parts and methods employed by me.

Heretofore, as I have said, it has been customary to employ a gin roll relatively dense, in order that a formation sufficiently stable to turn as a unit might be had and, as a consequence, the speed of rotation of the saws has been limited to from 350 to 450 R. P. M., as higher speeds with a roll of such density, were destructive of the staple and generated so much friction and heat as to consume power unduly and to be therefore objectionable or dangerous. I have discovered that by increasing the speed of rotation of the saws to from 700 to 900 R. P. M. and at the same time decreasing the density of the roll to such a degree that it lacks density and stability sufficient to turn as a unit, the productivity of the gin both in quality and quantity may be very greatly increased. I achieve this attenuated roll by means of an integrating shaft, 1, carrying projecting fingers, 11, the free ends of which are preferably bent in the direction of rotation of the roll (see Fig. 1). This integrating shaft or core is mounted in bearings 12 in the end walls, a, of the roll box and lies along the longitudinal axis of the roll and is capable of turning freely in said bearings, being unconnected with any moving part of the machine, i. e. not belted or driven in any way. Upon one end of this integrating roll I preferably provide a hand wheel 13.

This high-speed plus soft roll discovery is so far as I know limited in its application to air blast gins and is therefore an improvement upon that type of gin. The brush gin is unadapted to the high speed gin saws, since with twelve inch saws rotating at (say) 400 and having a peripheral speed of 1250 feet per minute, the brush, having, according to common practice in the gin machinery art, a peripheral speed about five or six times that of the saws with which it cooperates, would have a peripheral speed of about 7000 feet per minute. This is about the upward limit of safety in a brush and in itself acts as a limit, with other considerations, upon the rotative speed of the saw cylinders. With the air blast practically any air speed is possible so that, so far as this factor is concerned, the acceleration of the saw cylinder may be fixed without regard to the stripping of the fibre from the saws.

The operation is as follow: the high speed saws being rotated seed cotton is fed into the roll box in any desired fashion; usually by a gin feeding mechanism, properly adjusted. The descending seed cotton contacts with the fingers 11 and the shaft 1 is turned carrying the seed cotton around and against the saw cylinder B, by the saws of which lint is seized and carried between the ginning ribs, D, the seeds being detached and dropping down and out of the gin in the customary manner. The seed cotton not taken by the saw cylinder is carried around by fingers 11, until an attenuated soft roll is formed about the integrating shaft 1. Such a roll, without the integrator would be substantially inoperative. It would fail to turn in sections or as a whole and would rope and twist and wherever along its length it failed to turn, ginning would cease and the seed cotton on the inlet side would accumulate and choke the feed. With the integrator shaft, so long as the saw cylinder actuates any part of the length of the roll, the entire roll is rotated, its weight being largely carried by the bearings in the side of the roll box, and any tendency of any saws to cut a kerf in the roll is entirely overcome. With this tenuous seed cotton roll, inoperable under the old conditions of ginning lacking coherence or density sufficient to form a unitary structure, the integrator 1, combines and supplies the uniting force which gives the soft roll the character and characteristics of a unitary roll, so far as turning is concerned, while having the character and characteristics of a soft roll, so far as ease in abstracting locks and fibres from the mass, quickly and without breakage, thus permitting of the employment of a saw cylinder operating at a speed approximately double that otherwise practicable, with increased production and decreased fibre breakage.

The soft roll itself is carried substantially by the shaft 1, so that the frictional resistance to turning, by reason of contact with the bottom or ends of the roll box is not great. The consequence is that the saw teeth, plucking at the periphery of the soft roll, meet a relatively small resistance to the abstraction of locks and fibres. The roll readily yields locks and fibres and rotates under the impulse of the saw teeth. The roll being relatively loose and uncondensed, the locks and fibres are not locked or tightly entangled in the roll mass, but draw out relatively loose and open and in this condition are dragged to and through the ribs, the seeds being stripped out in the process, from the loose fibres with which they are engaged.

The speed of rotation of the compound roll tends to be faster in the compound roll due to the fact that there is less frictional resistance to rotation to be overcome, but, due to the fact that the saw teeth easily engage and withdraw locks or fibres from the roll, the traction or driving force is less than it would otherwise be so that this tendency does not work to full effect. The compound roll, however, rotates more rapidly than the ordinary roll heretofore known and draws in and carries to the saws more seed cotton than the ordinary roll.

It is essential to my new mode of operation that the roll run quite freely and to this end that it be not restrained unduly. The support of the roll by the integrator shaft and the lightness of the soft roll, made possible by the use of the integrator shaft, make the new mode of operation and roll formation possible and permit the use of the high speed saw cylinder, with its increased quantity and quality production.

The use of the integrator 1, with its hand wheel is also useful in any gin in running out the last remains of a roll and ginning completely whatever may be in the roll box, which is not as gins have been heretofore operated, accomplished. In operating the hard roll there is, occasionally, from one cause or another of an accidental or irregular nature, a roll stoppage. Heretofore, the ginner has been in the habit of lifting the roll box and dropping it, throwing the stalled roll suddenly against the saw cylinder, a process known among ginners as "bumping" and obviously racking the machine. With the core shaft and hand wheel this is as unnecessary as it is obviously undesirable, as the roll may be turned to a new position to start it.

The hand wheel is especially useful in the initial formation of a "roll," the integrator shaft 1 with its projection fingers 11, being turned by hand until a soft roll is formed, which thereafter is actuated by the saws.

I claim:

1. In a gin, in combination, a roll box;

a saw cylinder and ginning ribs, all as usual; bearings in the end walls of the roll box; an integrator shaft having projecting fingers and end bearing-pivots, projecting into and closely fitting the end wall bearings and supported by the bearings for rotation in a fixed axial line along the length of the roll box, without contact of the roll with the roll box.

2. In a gin, in combination, a roll box; ginning ribs within the roll box; a high speed saw cylinder rotating at more than 650 R. P. M. and cooperating with the ginning ribs and the seed cotton mass; an air blast lint removing means; bearings in the end walls of the roll box; an integrator shaft having projecting fingers and end bearing-pivots projecting into and closely fitting the end wall bearings and supported by the bearings for rotation in a fixed axial line along the length of the roll box, without contact of the roll with the roll box.

Signed at Atlanta, Georgia, this twenty-third day of February, 1926.

NELSON B. HENRY.